US010605634B2

(12) United States Patent
Baeg et al.

(10) Patent No.: US 10,605,634 B2
(45) Date of Patent: Mar. 31, 2020

(54) TAPER PIPE-SHAPED AREA FLOW METER USING MAGNETOSTRICTIVE DISTANCE MEASUREMENT

(71) Applicant: HiLevel Co., Ltd., Dongnae-gu (KR)

(72) Inventors: Yeong-Joo Baeg, Busan (KR); Nam-Gyu Tak, Busan (KR)

(73) Assignee: HiLevel Co., Ltd., Busan (KR)

( * ) Notice: Subject to any disclaimer, the term of this patent is extended or adjusted under 35 U.S.C. 154(b) by 78 days.

(21) Appl. No.: 16/063,856

(22) PCT Filed: Jun. 14, 2016

(86) PCT No.: PCT/KR2016/006313
§ 371 (c)(1),
(2) Date: Jun. 19, 2018

(87) PCT Pub. No.: WO2017/115949
PCT Pub. Date: Jul. 6, 2017

(65) Prior Publication Data
US 2018/0372519 A1     Dec. 27, 2018

(30) Foreign Application Priority Data
Dec. 31, 2015  (KR) .......................... 10-2015-0190662

(51) Int. Cl.
*G01F 1/24*     (2006.01)
*G01F 1/22*     (2006.01)
(Continued)

(52) U.S. Cl.
CPC .................. *G01F 1/24* (2013.01); *G01F 1/22* (2013.01); *G01F 15/06* (2013.01); *G01F 15/063* (2013.01); *G01F 23/72* (2013.01); *G01S 13/10* (2013.01)

(58) Field of Classification Search
CPC ..................................... G01F 1/22; G01F 1/24
See application file for complete search history.

(56) References Cited

U.S. PATENT DOCUMENTS 5,014,559 A * 5/1991 Lew .......................... G01F 1/24
  73/861.56
5,193,400 A * 3/1993 Lew .......................... G01D 5/06
  73/440
(Continued)

FOREIGN PATENT DOCUMENTS

JP    11190644 A    7/1999
JP    2009219244 A  9/2009
(Continued)

OTHER PUBLICATIONS

International Search Report and the Written Opinion, International Patent Application PCT/KR2016/006313, Oct. 13, 2016, 7 pp.

*Primary Examiner* — Jewel V Dowtin
(74) *Attorney, Agent, or Firm* — Kaplan Breyer Schwarz, LLP (57) ABSTRACT

A taper pipe-shaped area flow meter uses a magnetostrictive distance measurement method through which a flow rate may be accurately measured by measuring a height of a float through a magnetostrictive method. A taper pipe-shaped area flow meter using a magnetostrictive distance measurement method includes a taper pipe including an inlet at a lower portion thereof and an outlet at an upper portion thereof and formed in a taper shape having a diameter decreasing downward, a float in which a magnet is embedded and a height of the float is changed according to a flow rate in the taper pipe, a probe shaft in which a magnetrostrictive line is embedded and which is installed in the taper pipe and detects a position of the float through the magnetostrictive method, and a magnetostrictive distance measuring part, which is configured to apply a pulse to the probe shaft, receive a signal reflected by the magnet of the float, measure a position of the float, and calculate a flow rate from the position of the float. The taper pipe-shaped area flow meter using the magnetostrictive distance measurement method (Continued)

has a high accuracy because the magnetostrictive method is applied thereto and may inexpensively measure a flow rate by using a simple mechanical structure, and there is an advantage in that a measured value is provided as an electric signal and used in various fields such as a process control.

4 Claims, 6 Drawing Sheets

(51) Int. Cl.
*G01F 15/06* (2006.01)
*G01S 13/10* (2006.01)
*G01F 23/72* (2006.01)

(56) References Cited

U.S. PATENT DOCUMENTS

| | | | | |
|---|---|---|---|---|
| 5,347,875 | A * | 9/1994 | Lew | G01F 1/24 340/870.37 |
| 5,655,568 | A * | 8/1997 | Bhargava | G05D 7/0146 137/557 |
| 6,988,419 | B2 * | 1/2006 | Muller | G01F 1/22 73/861.57 |
| 7,219,559 | B2 * | 5/2007 | Sugi | G01F 1/24 73/861.56 |
| 8,256,304 | B2 * | 9/2012 | Therrian | G01F 15/14 73/861.57 |
| 2007/0227265 | A1 * | 10/2007 | Sugi | G01F 1/24 73/861.56 |
| 2008/0047359 | A1 * | 2/2008 | Zheng | G01F 1/24 73/861.53 |
| 2017/0322058 | A1 * | 11/2017 | Dennison | G01F 1/22 |

FOREIGN PATENT DOCUMENTS

| | | |
|---|---|---|
| JP | 2014009971 A | 1/2014 |
| KR | 101235793 | 2/2013 |
| KR | 101526962 | 6/2015 |

* cited by examiner

TAPER PIPE-SHAPED AREA FLOW METER USING MAGNETOSTRICTIVE DISTANCE MEASUREMENT

TECHNICAL FIELD

The present invention relates to a taper pipe-shaped area flow meter, and more specifically, to a taper pipe-shaped area flow meter using a magnetostrictive distance measurement method in which a flow rate may be accurately measured by measuring a height of a float through a magnetostrictive method.

BACKGROUND ART

Generally, flow meters having various types are used to measure a flow rate of liquid or gas. Among them, a taper pipe-shaped area flow meter has a simple structure and a degree of accuracy high enough to be used for calibration of a flow meter, but may not generate a measured value as an electric signal, and thus utilization thereof is limited to a field in which a flow rate is visually checked through a field indicator by which the measured value is seen through a gradation. Therefore, the taper pipe-shaped area flow meter may not be used in a flow rate control system for a process control.

In a differential pressure flow meter, a flow path of a fluid is fixed, and a pressure difference measured at up and down streams of a fastener, has a functional relation with a flow rate. However, since an area flow meter has a structure in which a flow path of a fluid is changed according to a flow rate, a pressure difference between upper and lower sides of a float is always constantly maintained. That is, in the area flow meter, since a change in an area of a flow path through which a fluid flows is a function of a flow rate, the change in the area of the fluid may be linearly related to the flow rate when a taper pipe is used.

Figure 1:
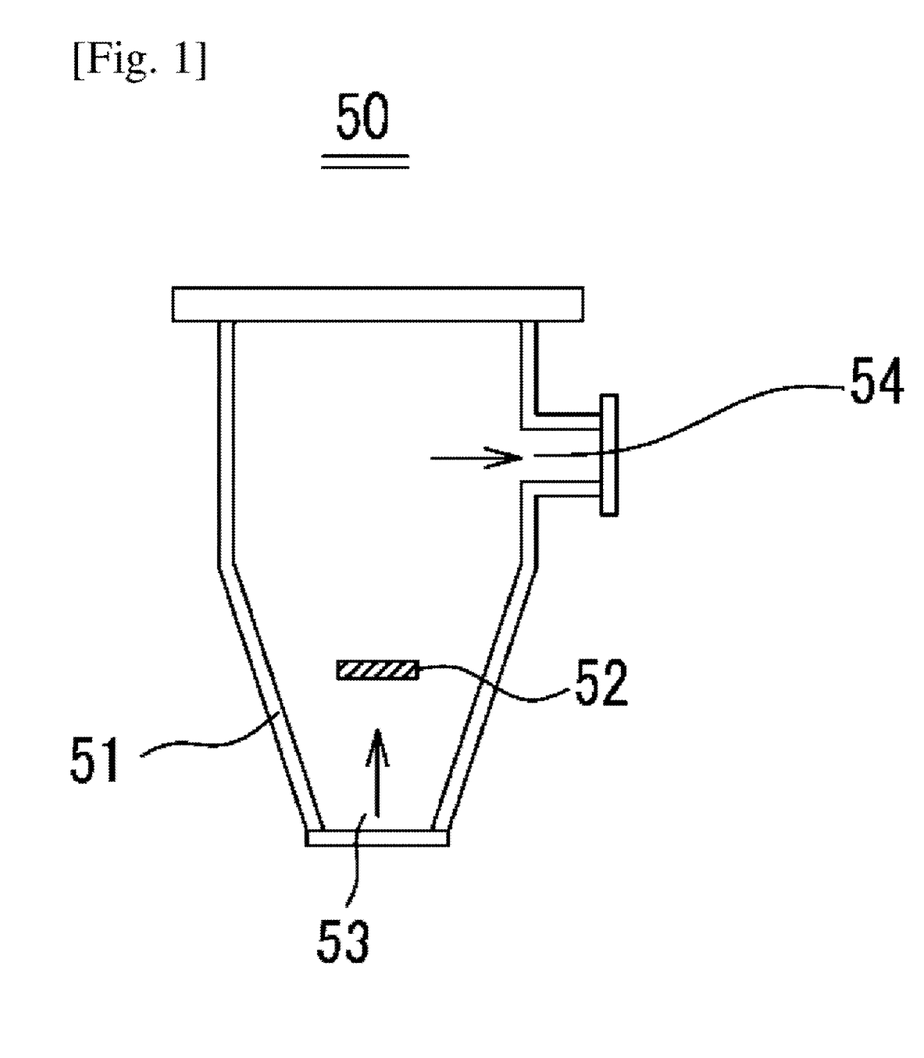
FIG. 1 is a schematic view illustrating a conventional taper pipe-shaped area flow meter.

There are many kinds of taper pipe-shaped area flow meters, and a taper pipe-shaped area flow meter 50 as illustrated in FIG. 1, which is one of the most simple taper pipe-shaped area flow meters, includes a taper transparent glass or plastic pipe 51 in which an inlet 53 and an outlet 54 are formed and a float 52 moves vertically in the pipe. Referring to FIG. 1, when a taper pipe 51 in which a wide upper portion narrows toward a lower portion is vertically installed in the taper pipe-shaped area flow meter 50, the float 52 moves vertically in the pipe, and the float 52 moves upward proportional to a flow rate when a fluid flows from the lower portion to the upper portion in the taper pipe 51. A reason for such a motion is that a flow of the fluid serves as a fastener for the float 52 and a pressure difference occurs at a front and a rear of the float 52. When the float 52 moves upward, an area of the taper pipe 51 increases, a pressure difference decreases, the float 52 balances at a position at which the pressure difference balances a weight of the float 52, and the float stops as illustrated in FIG. 1.

In addition, since a flow cross sectional area of the taper pipe 51 determined according to a position to which the float 52 moved vertically is proportional to a flow rate, the flow rate is measured by detecting a position to which the float 52 moved vertically. For example, in a related art published in the Korean Patent Registration (B1) as Korean Patent Registration No. 10-0650526, a conventional area flow meter in which a float is disposed in a taper pipe including an inlet and an outlet is disclosed.

In addition, a float type area flow meter, which is published in the Patent Publication (A) as Publication No. 2002-0006138, includes a main body having a taper flow path in which a diameter thereof decreases downward, a lower end thereof communicates with an inlet of the flow path, and an upper end thereof communicates with an outlet of the flow path, a float accommodated in the taper flow path of the main body and configured to vertically move according to a flow rate, and a distance measurement unit which is installed above the taper flow path of the main body receives relational data between a distance to the float therefrom and a flow rate, measures a position of the float, calculates a flow rate from the relational data between the distance and the flow rate, and outputs the flow rate, and the distance measurement unit includes a laser or ultrasonic sensor located directly above the taper flow path and configured to measure a distance to the float therefrom and output a measured value as an electric signal.

Technical Problem

Since almost all conventional taper pipe-shaped area flow meters have been operated through a method through which a height of a float is checked through a glass pipe, it is difficult to accurately calculate a flow rate, and although a method through which a laser or radar sensor or an ultrasonic sensor is used as a sensor for detecting a position of a float has been suggested as a method for detecting a flow rate as an electric signal, it is difficult to precisely measure the flow rate, and thus it has not been commercialized.

That is, since a distance measurement technology through a radar or laser method uses a microwave and a time period, which is measured between radiation of a pulse and receiving of the pulse reflected by a target object and returned to its radiation position, is too short due to properties of a radio wave, it is not suitable to measure a short distance of 50 cm or less, and since refraction and diffraction are severe due to a property of wave propagation in a distance measurement technology through an ultrasonic wave method and a propagation speed based on a transmitting medium is not constant, there is a problem in that the technology may not be applied for measuring distance due to a large error in measurement.

The present invention is directed to providing a taper pipe-shaped area flow meter using a magnetostrictive distance measurement method in which a height of a float is measured through a magnetostrictive method to accurately measure a flow rate.

SUMMARY

One aspect of the present invention provides a taper pipe-shaped area flow meter using a magnetostrictive distance measurement method, including: a taper pipe including an inlet at a lower portion thereof and an outlet at an upper portion thereof and formed in a taper shape having a diameter decreasing downward; a float in which a magnet is embedded and a height of the float is changed according to a flow rate in the taper pipe; a probe shaft in which a magnetostrictive line is embedded and which is installed in the taper pipe and detects a position of the float through a magnetostrictive method; and a magnetostrictive distance measuring part, which is configured to apply a pulse to the probe shaft, receive a signal reflected by the magnet of the float, measure a position of the float, and calculate a flow rate from the position of the float.

The area flow meter may directly display the flow rate on a main body or transmit measured data of the distance measuring part to the outside as an electric signal, and the magnetostrictive distance measuring part may include a pulse generator configured to generate a predetermined pulse according to a start signal and apply the pulse to the probe shaft, a reflected wave receiver configured to receive a reflected wave signal due to the pulse from the probe shaft, a comparator configured to compare a signal received by the reflected wave receiver with a predetermined comparison voltage and output a stop signal, a comparison voltage generator configured to supply the comparison voltage to the comparator according to a control signal, and a microprocessor configured to control the comparison voltage generator to supply a first voltage as the comparison voltage when measurement is required, transmit the start signal to the pulse generator to generate the pulse, start an internal timer, try to detect data received according to an output of the comparator, repeat a process of pulse application and reception by controlling the comparison voltage generator to decrease the comparison voltage when there are no received signals, store the comparison voltage at that time as an upper limit value of the received signal when a received signal is detected for a first time, repeat the process of pulse application and reception again while decreasing the comparison voltage, store the comparison voltage at that time as a lower limit value of the received signal when a pulse width of the received signal becomes a predetermined value or more, set a center value between the upper limit value and the lower limit value as a reference comparison voltage, transmit the start signal to the pulse generator for measurement so as to generate a pulse when the reference comparison voltage is set, start the internal timer, read a value from the timer when the comparator compares the received signal with the reference comparison voltage and outputs the stop signal, calculate a time period between application of the pulse and reception of a reflected wave, and calculate a height of a surface of a liquid from the time period.

The magnetostrictive distance measuring part may further include a communication part configured to transmit measured data, and the microprocessor may also calculate a flow rate from a height of a liquid, receive a temperature from a temperature sensor to convert the flow rate into a net flow rate, and transmit the net flow rate to the outside through the communication part.

DETAILED DESCRIPTION

The present invention and the technical target to be achieved by performing the present invention may be clear from the exemplary embodiments of the present invention which will be described below. The following embodiments are examples only for describing the present invention and are not for limiting the scope of the present invention.

Figure 2:
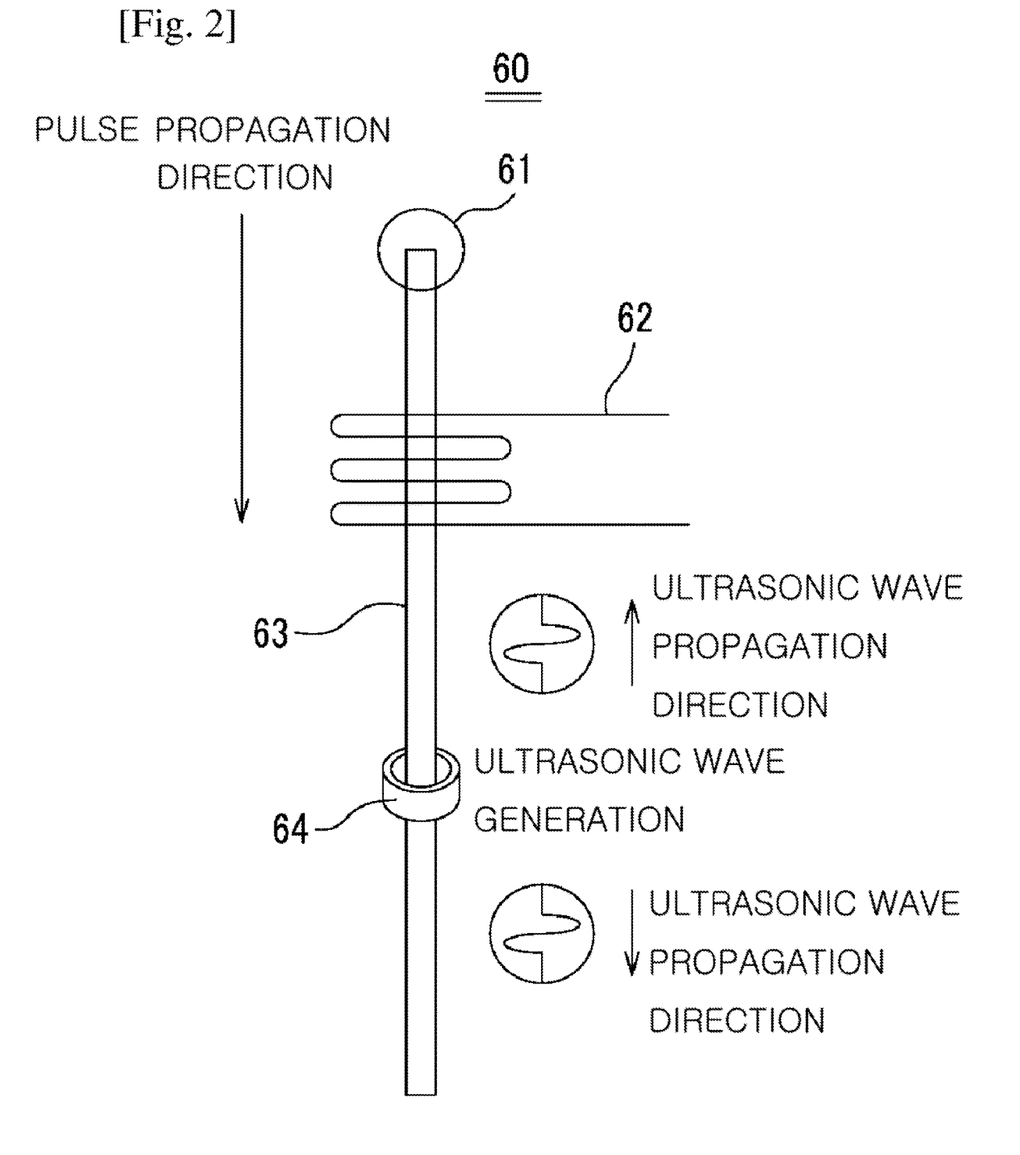
FIG. 2 is a view for describing a magnetostrictive distance measurement method applied to the present invention.

FIG. 2 is a view for describing a magnetostrictive distance measurement method applied to the present invention.

First, a taper pipe-shaped area flow meter using the magnetostrictive distance measurement method according to the present invention is a meter in which a magnetostrictive method is applied to measure a distance to a float of the taper pipe-shaped area flow meter so as to inexpensively and accurately measure a height of the float. That is, the taper pipe-shaped area flow meter has a degree of accuracy high enough to be applied to calibration of a flow meter, but since the taper pipe-shaped area flow meter cannot generate a measured value as an electric signal, the taper pipe-shaped area flow meter is limited to a field in which a flow rate is visually checked. However, in the present invention, the taper pipe-shaped area flow meter accurately measures a position of the float in a taper pipe through the magnetostrictive method and supplies a measured value as an electric signal in order to use the electric signal in various fields such as a process control.

A distance measurement technology through the magnetostrictive method applied to the present invention uses a magnetostrictive phenomenon in which an elastic wave is generated when a magnetic field is applied to a magnetic material. As illustrated in FIG. 2, the distance measurement technology through the magnetostrictive method is a technology in which, when a float in which a permanent magnet 64 is embedded is disposed on a magnetostrictive line 63 to generate a transversal magnetic field and a pulse application unit 61 applies a pulse to the magnetostrictive line 63 and generates a magnetic field in a direction of a shaft, an elastic wave is generated at an intersection of the permanent magnet 64 and the magnetic field, and a time period, which is measured between application of the pulse and receiving of the elastic wave by a receiver 62 wherein the elastic wave is transmitted through the magnetostrictive line 63, is measured to measure a distance from the pulse application unit 61 to the float in which the permanent magnet 64 is embedded.

Figure 3:
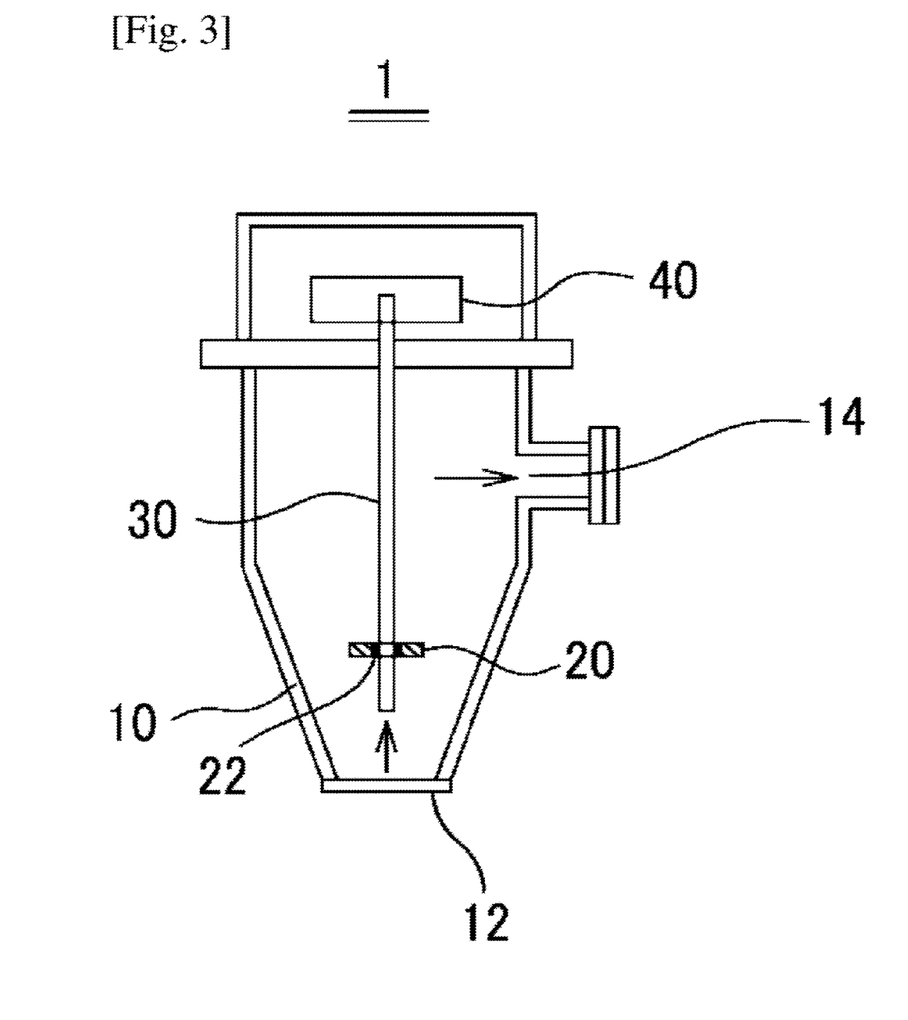
FIG. 3 is a schematic view illustrating a taper pipe-shaped area flow meter using the magnetostrictive distance measurement method according to the present invention.
Figure 4:
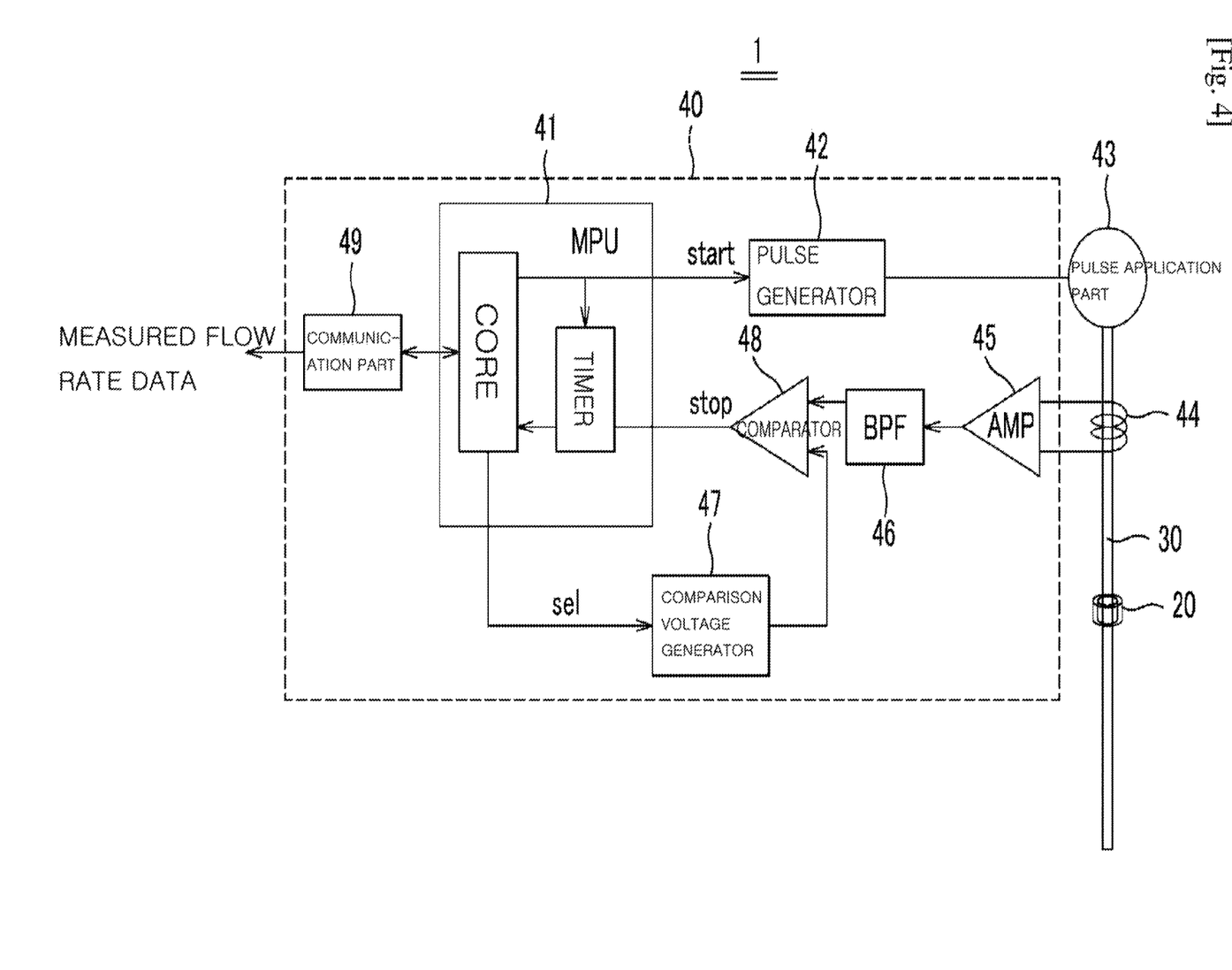
FIG. 4 is a block diagram of a configuration of a magnetostrictive distance measuring part illustrated in FIG. 3.

FIG. 3 is a schematic view illustrating a taper pipe-shaped area flow meter using the magnetostrictive distance measurement method according to the present invention, and FIG. 4 is a block diagram of a configuration of a magnetostrictive distance measuring part illustrated in FIG. 3.

As illustrated in FIG. 3, a taper pipe-shaped area flow meter 1 using the magnetostrictive distance measurement method includes a taper pipe 10, a float 20 in which a permanent magnet 22 is installed, a probe shaft 30 in which a magnetostrictive line is embedded, and a magnetostrictive distance measuring part 40 according to an embodiment of the present invention.

Referring to FIG. 3, the area flow meter 1 of the present invention includes the taper pipe 10, which has an inlet 12 at a lower end thereof and an outlet 14 at an upper portion thereof, formed in a taper shape, the float 20 in which the permanent magnet 22 is embedded, and a height of the float 20 is changed according to a flow rate in the taper pipe 10, the probe shaft 30 in which the magnetostrictive line is embedded and which is installed at a center of the taper pipe 10 to detect a position of the float 20 through the magnetostrictive method, and the magnetostrictive distance measuring part 40 configured to measure a position of the float 20 by applying a pulse to the probe shaft 30 and receiving a signal reflected by the float 20 to calculate a flow rate. Here, the distance measuring part 40 may display a measured flow rate value on a main body or supply the measured flow rate value as an electric signal to the outside through a communication port to display the electric signal on an external liquid crystal display (LCD) or use the electric signal for other purposes such as a process control.

In addition, the float 20 may be formed in a structure in which a float of a conventional taper pipe-shaped area flow meter is used as it is and the cylindrical permanent magnet 22 is embedded in the float.

In addition, as illustrated in FIG. 4, the magnetostrictive distance measuring part 40 includes a microprocessor unit (MPU) 41, a pulse generator 42, a pulse application part 43, a reflected wave receiver 44, an amplifier 45, a band pass filter (BPF) 46, a comparison voltage generator 47, a comparator 48, and a communication part 49.

Referring to FIG. 4, the MPU 41 includes a central processing unit (CPU) core, an embedded timer, an electrically erasable programmable read-only memory (EEPROM), digital input and output terminals, analog input and output terminals, and the like, and executes a measurement software according to the present invention. That is, when measurement is required, the MPU 41 controls the comparison voltage generator 47 to supply a first voltage as a comparison voltage, transmits a start signal to the pulse generator 42 to generate a pulse, and starts an internal timer. In addition, when the MPU 41 tries to detect data received according to an output of the comparator 48 and there are no received signals, the MPU 41 repeats a process of pulse application and reception by controlling the comparison voltage generator 47 to decrease the comparison voltage, and when a received signal is detected for a first time, the MPU 41 stores a comparison voltage at that time as an upper limit value of the received signal. In addition, the MPU again repeats the process of pulse application and reception while decreasing the comparison voltage, and when a pulse width of the received signal becomes a predetermined value or more, the MPU 41 stores the comparison voltage at that time as a lower limit value of the received signal and sets a center value between the upper limit value and the lower limit value as a reference comparison voltage. When the reference comparison voltage is set, the MPU 41 transmits the start signal to the pulse generator 42 for measurement so as to generate a pulse and starts the internal timer, and when the comparator 48 compares the received signal with the reference comparison voltage and outputs the stop signal, the MPU 41 reads a value from the timer and calculates a time period between application of the pulse and receiving of a reflected wave (elastic wave) and calculates a height of a surface of a liquid from the time period.

The pulse generator 42 is formed with a multistage double voltage circuit, and when a start signal is transmitted from the MPU 41 to the pulse generator 42, the pulse generator 42 generates a pulse having a predetermined magnitude and applies the pulse to the magnetostrictive line in the probe shaft 30 through the pulse application part 43.

The amplifier 45 receives and amplifies a reflected wave (elastic wave) signal from the reflected wave receiver 44 through the magnetostrictive line in the probe shaft after application of a pulse, the BPF 46 removes a noise of an unnecessary band for a first time, and the comparator 48 compares a filtered received signal with the comparison voltage and transmits a comparison result to the MPU 41 as a stop signal. Accordingly, the MPU 41 may calculate a time period between application of a pulse and receiving of a reflected wave by detecting a time at which the timer is ended by a stop signal after the MPU 41 starts the internal timer using a start signal.

The comparison voltage generator 47 selects one among multistage comparison voltages according to a control of the MPU 41 and outputs a selected multistage comparison voltage to the comparator 48, and the communication part 49 performs communication between a display apparatus or external host apparatus (not shown) and the processor 41. That is, data of a measurement result provided by the MPU 41 may be transmitted to and displayed on the display apparatus (not shown).

For detecting a position of the float 20 in which a vertical height is changed according to a flow rate, the taper pipe-shaped area flow meter 1 configured as described above and using the magnetostrictive distance measurement method according to the present invention applies a pulse to the magnetrostrictive line of the probe shaft 30, generates a magnetic field in a direction of the shaft, receives an elastic wave generated at an intersection between the permanent magnet 22 of the float 20 and the magnetic field, transmits a pulse to measure a time period between transmission of the pulse and receiving of the elastic wave transmitted through the magnetrostrictive line, detects a position of the float 20, and calculates a flow rate.

Figure 5:
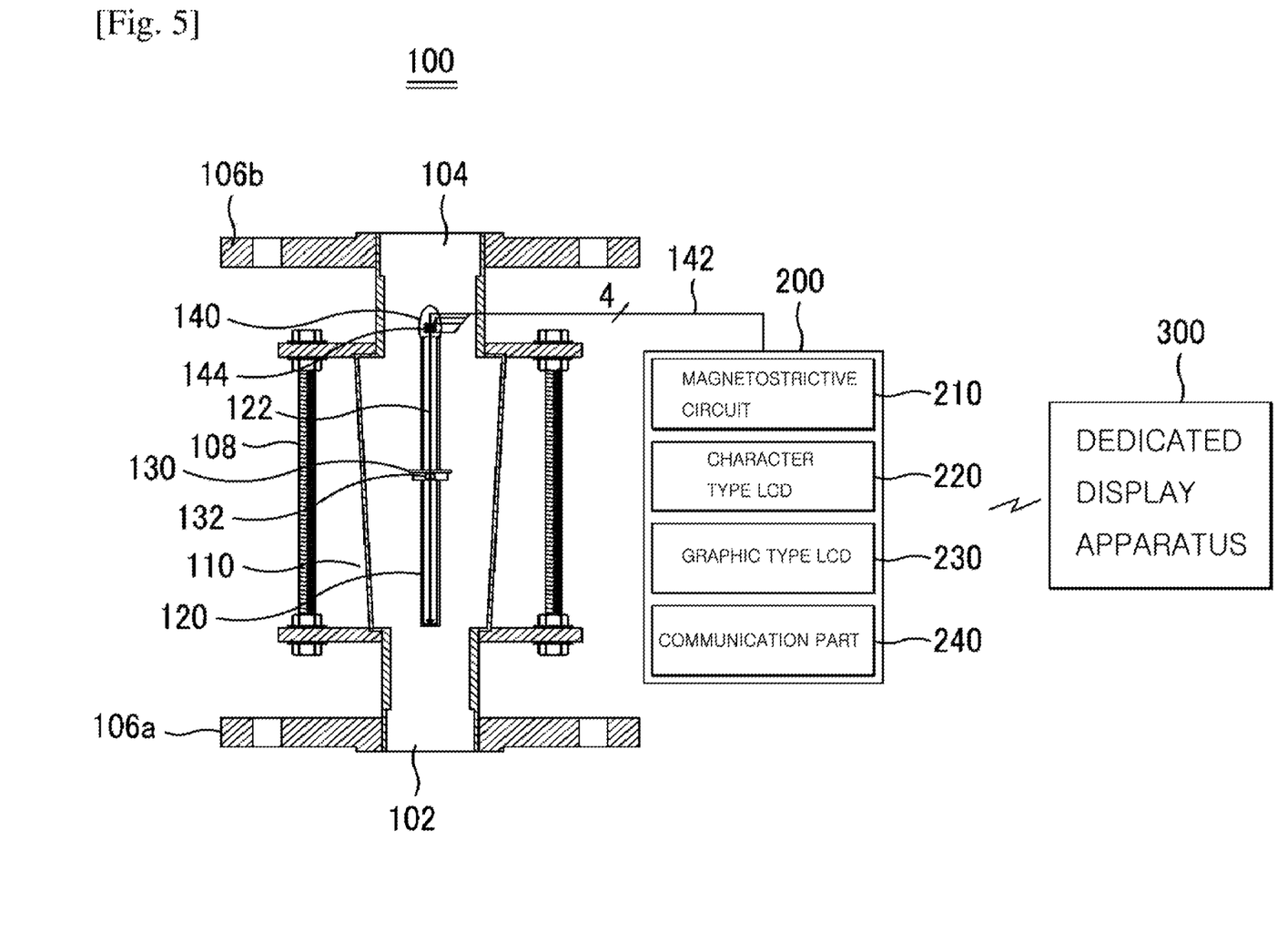
FIG. 5 is a view illustrating an example of the taper pipe-shaped area flow meter using the magnetostrictive distance measurement method according to the present invention.

FIG. 5 is a view illustrating an example of the taper pipe-shaped area flow meter using the magnetostrictive distance measurement method according to the present invention.

Referring to FIG. 5, in a taper pipe-shaped area flow meter 100 according to an embodiment of the present invention, an inlet 102 and an outlet 104 are disposed in a row, flanges 106a and 106b are respectively formed at the inlet 102 and the outlet 104 and perpendicularly installed on a pipe through which a fluid flows such that a flow rate may be measured. A taper pipe 110 is coupled to and stably supported by a support rod 108 through a nut and bolt method, and a float 130 fitted to the probe shaft 120 and configured to vertically move along the shaft 120 according to a fluid flow and a probe shaft 120 in which a magnetostrictive line 122 is embedded are disposed in an inner space of the taper pipe 110. A permanent magnet 132 is embedded in the float 130, and a pulse application part 142 for applying a pulse and a receiver 144 for receiving an elastic wave are disposed at an upper end 140 of the probe shaft 130 and connected to an external control box 200 through four lines.

The control box 200 installed outside the taper pipe 110 includes a magnetostrictive circuit 210, which is configured to apply a pulse to the magnetostrictive line 122, process a signal received by the receiver 144, calculate a height (distance) of the float 130, and convert the calculated height into a flow rate value to measure a flow rate, a character type LCD 220 for displaying data of a flow rate measured by the magnetostrictive circuit 210, a graphic type LCD 230 for displaying data of the flow rate measured by the magnetostrictive circuit 210, and a communication part 240 for transmitting data of the flow rate measured by the magnetostrictive circuit 210 to a remote apparatus. The communication part 240 may transmit measured data to a dedicated display apparatus 300 using a wired/wireless signal, and thus the dedicated display apparatus 300 may display information such as a measured flow rate and the like at a management center and the like.

Figure 6:
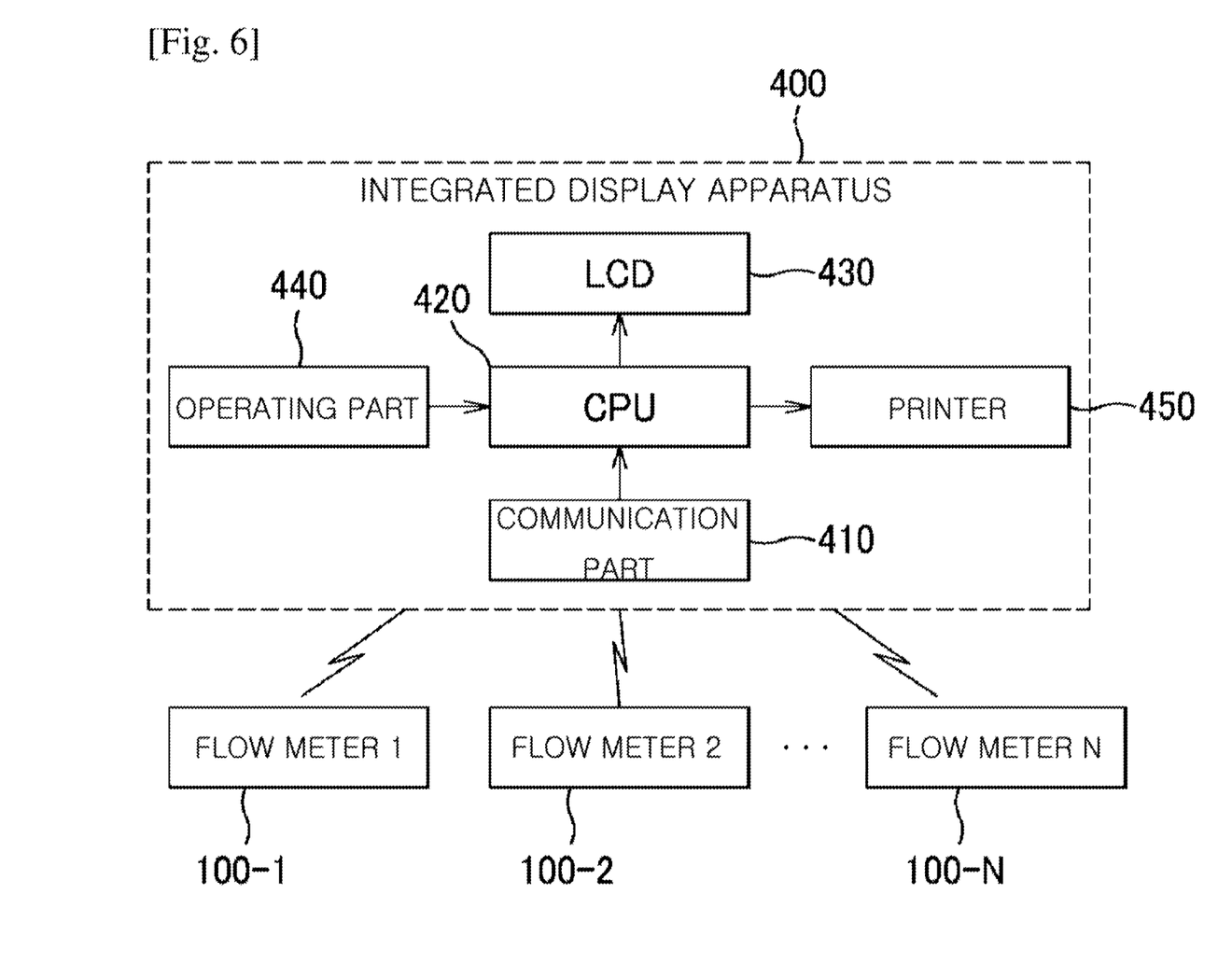
FIG. 6 is a view illustrating another example of the taper pipe-shaped area flow meter using the magnetostrictive distance measurement method according to the present invention.

FIG. 6 is a view illustrating another example of the taper pipe-shaped area flow meter using the magnetostrictive distance measurement method according to the present invention.

Referring to FIG. 6, in a case in which a plurality of flow meters 100-1 to 100-N for a process control or simultaneous processing are dispersedly installed, the flow meters 100-1 to 100-N and an integrated display apparatus 400 may be connected by a wired/wireless communication method to display data together.

The integrated display apparatus 400 includes a communication part 410 for communicating with the flow meters 100-1 to 100-N, an operating part 440 for inputting an operation, an LCD 430 for displaying measured values of the flow meters 100-1 to 100-N, a printer 450 for printing the measured values, and a CPU 420 for controlling an overall operation of the integrated display apparatus 400, and displays the measured values received from the flow meters 100-1 to 100-N on the LCD 430 or prints the measured values using the printer 450 through a method selected according to an input of the operating part 440.

While the present invention has been described with reference to the accompanying drawings as described above, it will be understood that various modifications and other equivalent embodiments may be made from the above description by those skilled in the art.

INDUSTRIAL APPLICABILITY

The taper pipe-shaped area flow meter using the magnetostrictive distance measurement method according to the present invention has high accuracy because the magnetostrictive method is applied thereto and can inexpensively measure a flow rate by using a simple mechanical structure. For example, according to the embodiment of the present invention, since a degree of accuracy of distance measurement is 0.1 mm and a measurement interval thereof is 0.1 seconds, a height of the float can be accurately measured, and thus a flow rate can be precisely measured.

In addition, since the taper pipe-shaped area flow meter using the magnetostrictive distance measurement method according to the present invention measures a position of the float using the magnetostrictive method, there is an advantage in that a measured value is provided as an electric signal and used in various fields such as a process control.

The invention claimed is:

1. A taper pipe-shaped area flow meter using a magnetostrictive distance measurement method, comprising:
a taper pipe including an inlet at a lower portion thereof and an outlet at an upper portion thereof and formed in a taper shape having a diameter decreasing downward;
a float in which a permanent magnet is embedded, wherein a height of the float is changed according to a flow rate in the taper pipe, and a through hole is formed in a center of the float;
a probe shaft formed in a rod shape in which a magnetrostrictive line is embedded, configured to pass through the through hole of the float in the taper pipe, be vertically installed in the taper pipe, and detect a position of the float through a magnetostrictive method; and
a magnetostrictive distance measuring part which is configured to apply a pulse to the probe shaft, receive a signal reflected by the permanent magnet of the float, measure a position of the float, and calculate a flow rate from the position of the float,
wherein the taper pipe-shaped area flow meter accurately measures the position of the float using a magnetostrictive method, and
wherein the magnetostrictive distance measuring part includes:
a pulse generator configured to generate a predetermined pulse according to a start signal and apply the pulse to the probe shaft;
a reflected wave receiver configured to receive a reflected wave signal due to the pulse from the probe shaft;
a comparator configured to compare a signal received by the reflected wave receiver with a predetermined comparison voltage and output a stop signal;
a comparison voltage generator configured to supply the comparison voltage to the comparator according to a control signal; and
a microprocessor configured to control the comparison voltage generator to supply a first voltage as the comparison voltage when measurement is required, transmit the start signal to the pulse generator to generate the pulse, start an internal timer, try to detect data received according to an output of the comparator, repeat a process of pulse application and reception by controlling the comparison voltage generator to decrease the comparison voltage when there are no received signals, store the comparison voltage at that time as an upper limit value of the received signal when a received signal is detected for a first time, repeat the process of pulse application and reception again while decreasing the comparison voltage, store the comparison voltage at that time as a lower limit value of the received signal when a pulse width of the received signal becomes a predetermined value or more, set a center value between the upper limit value and the lower limit value as a reference comparison voltage, transmit the start signal to the pulse generator for measurement so as to generate a pulse when the reference comparison voltage is set, start the internal timer, read a value from the timer when the comparator compares the received signal with the reference comparison voltage and outputs the stop signal, calculate a time period between application of the pulse and reception of a reflected wave, and calculate a height of a surface of a liquid from the time period.

2. The taper pipe-shaped area flow meter of claim 1, wherein the flow rate is directly displayed on a main body, or measured data of the distance measuring part is transmitted to the outside as an electric signal.

3. The taper pipe-shaped area flow meter of claim 1, wherein the magnetostrictive distance measuring part further includes a communication part configured to transmit measured data.

4. The taper pipe-shaped area flow meter of claim 1, wherein the taper pipe includes an inlet and an outlet disposed on a row and flanges formed at the inlet and the outlet and is vertically installed in a pipe in which a fluid flows.

* * * * *